United States Patent [19]

Selmeczi et al.

[11] 4,015,997

[45] * Apr. 5, 1977

[54] PROCESS FOR STABILIZING AQUEOUS COAL SLUDGES

[75] Inventors: Joseph G. Selmeczi; Donald H. Marlin, both of Pittsburgh; Daniel W. Kestner, Coraopolis, all of Pa.

[73] Assignee: Dravo Corporation, Pittsburgh, Pa.

[ * ] Notice: The portion of the term of this patent subsequent to Nov. 18, 1992, has been disclaimed.

[22] Filed: July 22, 1975

[21] Appl. No.: 598,117

Related U.S. Application Data

[63] Continuation-in-part of Ser. No. 339,151, March 8, 1973, Pat. No. 3,920,795.

[52] U.S. Cl. .......................... 106/287 R; 106/117; 106/287 SS
[51] Int. Cl.$^2$ ....................................... C08K 11/00
[58] Field of Search .......... 106/287 SS, 287 R, 117

[56] References Cited

UNITED STATES PATENTS 3,920,795  11/1975  Selmeczi et al. .................. 423/242

Primary Examiner—Theodore Morris
Attorney, Agent, or Firm—Parmelee, Miller, Welsh & Kratz

[57] ABSTRACT

The solids content of aqueous coal sludge slurries such as coal washings are stabilized in a hardened state by concentrating the solids content thereof, adding to the concentrated coal sludge 2–50% by weight of the solids of granulated blast furnace slag, with intimate mixing, and maintaining the mixture in a quiescent state and in the presence of excess water to produce a sedentary mass having load supportive properties suitable as landfill.

5 Claims, No Drawings

PROCESS FOR STABILIZING AQUEOUS COAL SLUDGES

CROSS-REFERENCE TO RELATED APPLICATION

This application is a continuation-in-part of our co-pending application Ser. No. 339,151, filed Mar. 8, 1973, and entitled "Stabilization of Sludge Slurries," now U.S. Pat. No. 3,920,795.

BACKGROUND OF THE INVENTION

In the beneficiating of various coals for the purpose of removing undesirable waste materials, the waste materials and finely divided coal particles are usually separated from the desired coal by hydraulic processing. As a result, aqueous coal sludge slurries are produced which contain very finely divided suspended solid particles. The solid portions of such slurries are often increased by separation procedures or merely natural settling in ponds. Such solids, because of their finely divided physical state, are not usable as a landfill material in that they have poor load supportive properties.

It is an object of the present invention to convert the solids content of aqueous coal sludges to a sedentary mass suitable as landfill.

It is another object of the invention to produce sedentary masses of such solids, which masses are far less prone to the effects of leaching, thus resulting in a considerable reduction in the level of contamination of adjacent ground waters by undesirable soluble elements or compounds contained in the sedentary masses.

BRIEF DESCRIPTION OF THE INVENTION

The solids content of coal processing sludges, such as coal washings, are converted into a sedentary mass having good load supportive properties by concentrating the sludge to a solids content of between 20–80 weight percent solids and adding thereto, with intimate mixing, granulated blast furnace slag in an amount of between 2–50 weight percent based upon the weight of the solids. The mixture is then maintained in the presence of excess water, in a quiescent state, whereby the solids are formed into a load supportive sedentary mass.

DETAILED DESCRIPTION

Aqueous coal sludges from coal processing are converted into load supportive masses according to the present process. Such sludges include coal preparation flotation tailings resulting from classification and washing of coal which generally contain clays, fine shale, pyrite and other impurities in finely divided form.

For the purpose of the present process, the solids content of the sludge should contain between about 20–80% by weight of solids. In some instances, for example with the coal flotation tailings, the solids content of the sludge may vary. For example, a coal flotation slurry may contain only about 2% solids, while, following thickener treatment, the thickener underflow would normally contain 15–35 weight percent solids. Permitting the tailings to settle in a pond or the like can further increase the solids content to 45–65 weight percent. Thickening of such sludges by mechanical filtration or the like will increase such sludges to 60–80 weight percent solids, which, even at this solids content, provides a material unsuitable for use as a landfill.

These coal flotation slurries generally contain very small particle size solids with typical particle size ranges being:

| | | |
|---|---|---|
| +28 mesh | – | 0 to 20 weight percent |
| +100 mesh | – | 0 to 50 weight percent |
| +200 mesh | – | 1 to 70 weight percent |
| –325 mesh | – | 25 to 95 weight percent |

In the present invention, the coal processing waste sludge, if not within the required range, should be concentrated to the extent that the sludge contains 20–80 weight percent solids, with such concentration being effected by mechanical separation means or settling of the solids.

To the aqueous coal processing waste sludge containing 20–80 percent by weight solids there is added granulated blast furnace slag in an amount of 2–50 percent by weight based upon the weight of solids in the sludge. The granulated blast furnace slag usable in the present invention is that formed by water quenching of molten slag from ironmaking processes and is described in our copending application Ser. No. 339,151, filed Mar. 8, 1973, now U.S. Pat. No. 3,920,795 the contents of said application being incorporated herein by reference.

The granulated blast furnace slag, as described in said copending application, is ground to a particle size having a Blaine value of between 1800–5000 sq. cm. per gram. We have discovered, however, that additional benefits are achieved by using a mixture of finely ground slag (1800–5000 sq. cm./gr. Blaine) and more coarsely ground slag. With the use of such mixtures, an early hardening of the solids is achieved by the finely ground slag, while the coarsely ground slag over a period of time further hardens the sedentary mass. Generally, a mixture of a finely ground blast furnace slag (particle size 1800–5000 sq. cm./gr.) and a more coarse blast furnace slag (particle size >2500 sq. cm./gr.) would be used wherein the fine material comprises 50–75 percent by weight and the coarse material 25–50 percent by weight. Such a mixture enables an early hardening to a hardness of about 3–7 tons/sq. ft. so as to enable transporting of machinery thereover in a short period of time, while the over-all mixture will, over a longer period of time, provide exceptional load supporting quality.

The granulated blast furnace slag is intimately mixed with the aqueous coal waste sludge and the mixture is then deposited in a landfill area, with chemical and physical changes taking place, in the presence of excess water so as to form a sedentary mass from the solids. The term excess water, as used herein, means the presence of free moisture so as to enable hydraulic bonding, and may include water to the extent that the mixture is moist to the touch as well as surface water over the mixture. In the presence of such excess water, the mixture is monitored in a quiescent state, and chemical as well as physical changes occur which form the sedentary mass. Preferably, the treated slurry is precured following addition of the granulated blast furnace slag by holding the same for a period of time before transfer to a landfill area, with the length of time of such precure depending upon the strength of the material desired prior to landfill usage.

The invention is further described by the following example.

EXAMPLE I

The aqueous slurried tailings from a coal beneficiation system (Nemacolin Mine) were inspected and found to contain 20.2 weight percent solids, with almost 100% of the solids being finer that 200 mesh in particle size, the solids comprising about 31.2% by weight of ash. The slurry was thickened to 66.2 weight percent solids and Aliquots A, B, C, D and E taken, to which variant amounts of granulated blast furnace slag (ground to 3500 Blaine) were added. Lime was added to certain of the aliquots to adjust the pH thereof as listed in the following Table I. The aliquots were each placed in covered plastic beakers and stored at about 72° F. and 100% humidity. The degree of sedentation was measured with a Model CL 700 soil test penetrometer over a period of time to illustrate the sedentation. The results were:

TABLE I

| Aliquot | A | B | C | D | E |
|---|---|---|---|---|---|
| pH | 8.05 | 12.4 | 9.05 | 12.6 | 9.25 |
| pH adjustment | None | Lime | None | Lime | None |
| Blast Furnace Slag (Weight % based on slurry solids) | None (Control) | None (Control) | 10% | 10% | 20% |
| Soil Test Penetrometer Readings (Tons/ft$^2$) | | | | | |
| Initial | Soft | Soft | Soft | Soft | Soft |
| 3 days elapsed time | Soft | Soft | Soft | 4.5+ | Soft |
| 5 days elapsed time | Soft | Soft | Soft | 4.5+ | Soft |
| 7 days elapsed time | Soft | Soft | Firming | 4.5+ | 4.5+ |
| 9 days elapsed time | Soft | Soft | 4.2 | 4.5+ | 4.5+ |
| 18 days elapsed time | Soft | Soft | 4.5+ | 4.5+ | 4.5+ |

EXAMPLE II

A further experiment was run using slurried flotation tailings from coal processing (Mathias Mine tailings), the solids of the thickener underflow of which contained about 31.9% by weight of ash. The slurry was thickened to about 60 weight percent solids by further settling, the solids particle size being 48% —less than 200 mesh, and 98%—less than 20 mesh. Three aliquots were taken, Aliquots A, B and C, to which 5%, 10% and 15%, based on solids, respectively, of granulated blast furnace slag (Blaine No. 3500) were added. Soil penetrometer tests as in Example I were made with the following results:

TABLE II

| Penetrometer Test Readings (Tons/ft$^2$) | A | B | C |
|---|---|---|---|
| Initial | Soft | Soft | Soft |
| 6 days elapsed time | Soft | Soft | Soft |
| 7 days elapsed time | Soft | Soft | — |
| 8 days elapsed time | Soft | 0.25 | 3.25 |
| 11 days elapsed time | Soft | — | 4.25 |
| 13 days elapsed time | Soft | 2.75 | 4.5+ |
| 15 days elapsed time | Soft | 4.25 | 4.5+ |
| 17 days elapsed time | Soft | 4.5 | 4.5+ |
| 19 days elapsed time | Soft | 4.5+ | 4.5+ |
| 20 days elapsed time | 3.5 | 4.5+ | 4.5+ |
| 25 days elapsed time | 4.5+ | 4.5+ | 4.5+ |

EXAMPLE III

Permeability tests were also run on aliquots of the 60 weight percent solids slurry described in Example II, with three aliquots taken, Aliquot D (no additive), Aliquot E (10% blast furnace slag) and Aliquot F (15% blast furnace slag), the additive slag being ground to 3500 Blaine No., to determine the effect of the slag additive on the permeability of water through the solid material. The results were:

TABLE III

| Permeability Coefficient (cm$_2$/sec) | D | E | F |
|---|---|---|---|
| 3 days elapsed time | $4 \times 10^{-6}$ | $2 \times 10^{-5}$ | $2 \times 10^{-5}$ |
| 7 days elapsed time | $1.5 \times 10^{-6}$ | $8 \times 10^{-6}$ | $8 \times 10^{-6}$ |
| 13 days elapsed time | — | $4 \times 10^{-8}$ | $1.2 \times 10^{-8}$ |
| 17 days elapsed time | — | N/A | N/A |
| 23 days elapsed time | $3.0 \times 10^{-7}$ | N/A | N/A |
| 31 days elapsed time | $3.0 \times 10^{-7}$ | N/A | N/A |

As can be seen, the permeability value of the treated slurries descrease rapidly, in the range of $10^{-8}$ within 13 days (values smaller than about $10^{-8}$ could not be measured) compared to the value of Aliquot D, which has not reached a value of $10^{-8}$ even after a month.

We claim:

1. A process for converting an aqueous coal processing waste sludge, containing finely divided coal particles and waste materials from the beneficiation of coal, into a sedentary mass of improved load supportive properties comprising:
    a. providing a concentrated aqueous coal processing waste sludge having a solids content in the range of 20–80 weight percent solids;
    b. adding to the concentrated sludge between 2–50 percent by weight, based on the weight of said solids, of granulated blast furnace slag;
    c. intimately mixing the combined concentrated sludge and granulated blast furnace slag; and
    d. maintaining the resulting mixture in a substantially quiescent stage and in the presence of excess water to produce a sedentary mass.

2. The process of claim 1 wherein said aqueous coal processing waste sludge contains less than 20 weight percent solids and wherein mechanical separation of a portion of the water in said sludge is made to increase the solids content thereof to the range of 20–80 weight percent prior to addition of said granulated blast furnace slag.

3. The process of claim 1 wherein said granulated blast furnace slag is added in an amount of between 5-25 percent by weight.

4. The process defined in claim 1 where said granulated blast furnace slag is ground to a particle size of between 1800-5000 sq. cm. per gram.

5. The process defined in claim 1 wherein said granulated blast furnace slag comprises a mixture of a first portion ground to a particle size of between 1800-5000 sq. cm. per gram and a second portion having a particle size coarser that 2500 sq. cm. per gram, with said first portion comprising 50-75 percent by weight of the total mixture of said granulated blast furnace slag.

* * * * *